United States Patent [19]

Kobasic

[11] Patent Number: 4,836,938

[45] Date of Patent: Jun. 6, 1989

[54] MULTIPURPOSE CHAIR STRUCTURE

[76] Inventor: Timothy J. Kobasic, 814 Third Avenue South, Escanaba, Mich. 49829

[21] Appl. No.: 909,777

[22] Filed: Sep. 19, 1986

[51] Int. Cl.$^4$ .............................................. A47B 85/04
[52] U.S. Cl. ................................... 224/155; 224/210; 224/261; 297/129
[58] Field of Search ............... 224/151, 153, 155, 158, 224/159, 210, 214, 261, 263, 160, 161, 184, 212; 190/8; 297/17, 129, 118

[56] References Cited

U.S. PATENT DOCUMENTS

| | | | |
|---|---|---|---|
| 2,742,212 | 4/1956 | Siftar | 224/161 |
| 3,265,260 | 8/1966 | Romney | 224/161 |
| 3,997,213 | 12/1976 | Smith et al. | 297/118 |
| 4,045,040 | 8/1977 | Fails | 280/1.5 |
| 4,248,367 | 2/1981 | Buel | 224/153 |
| 4,283,068 | 8/1981 | Keyser | 280/19 |
| 4,321,983 | 3/1982 | Nelson | 182/136 |
| 4,392,598 | 7/1983 | Dixon | 224/155 |
| 4,431,121 | 2/1984 | Bensette | 224/153 |
| 4,478,311 | 10/1984 | Anderson | 182/3 |
| 4,489,866 | 12/1984 | Korte | 224/155 |
| 4,533,151 | 8/1985 | Maitland | 280/47.25 |
| 4,645,262 | 2/1987 | Ferubottlen | 297/129 |
| 4,659,142 | 4/1987 | Kuchinsky, Jr. | 297/129 |

FOREIGN PATENT DOCUMENTS

| | | | |
|---|---|---|---|
| 3040261 | 5/1981 | Fed. Rep. of Germany | 224/259 |
| 3502923 | 7/1986 | Fed. Rep. of Germany | 224/153 |
| 1194851 | 6/1970 | United Kingdom | 297/129 |

*Primary Examiner*—Renee S. Luebke
*Attorney, Agent, or Firm*—Andrus, Sceales, Starke & Sawall

[57] ABSTRACT

The multipurpose chair of this invention comprises a generally planar upright frame which includes a pair of transversely spaced and vertically extending side members. A seat is mounted on the frame. The frame is provided with a backrest which extends between the side members and above the seat. The side members extend beneath the seat to provide a pair of transversely spaced legs. The pair of transversely spaced legs serve to support the seat for sitting when the frame is propped up against some fixed object. The legs have curved lower ends to enhance the stability of the structure and to serve as ski-like bearing members when the chair is used as a travois.

7 Claims, 2 Drawing Sheets

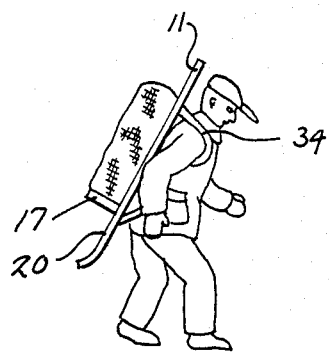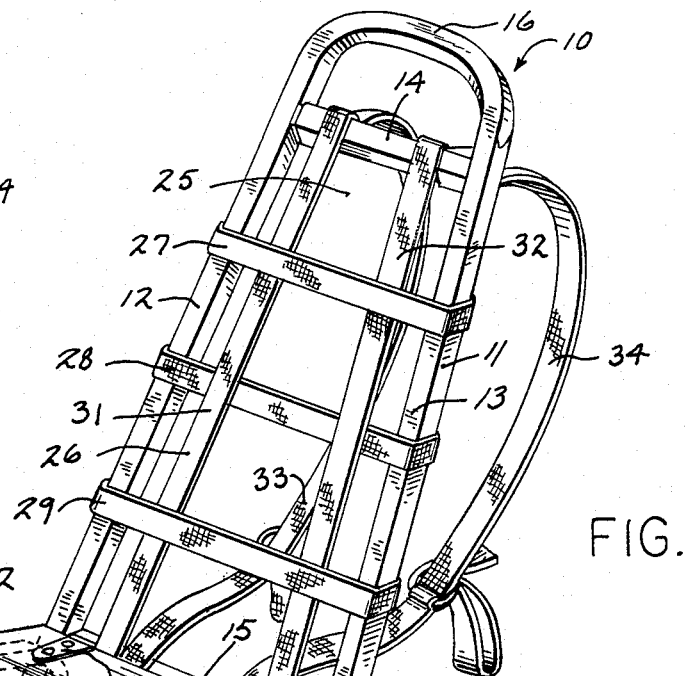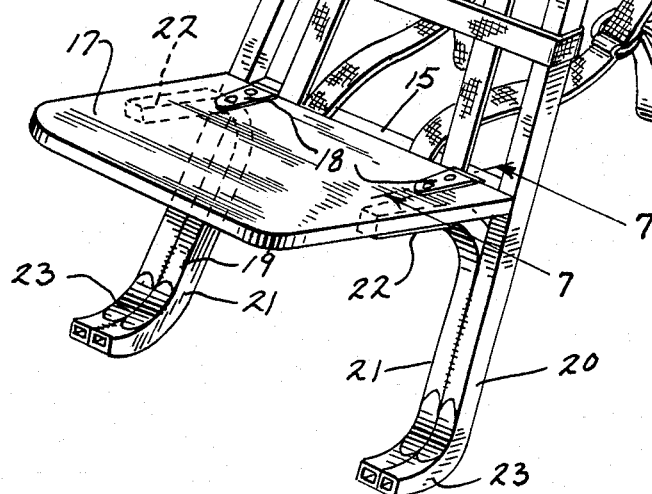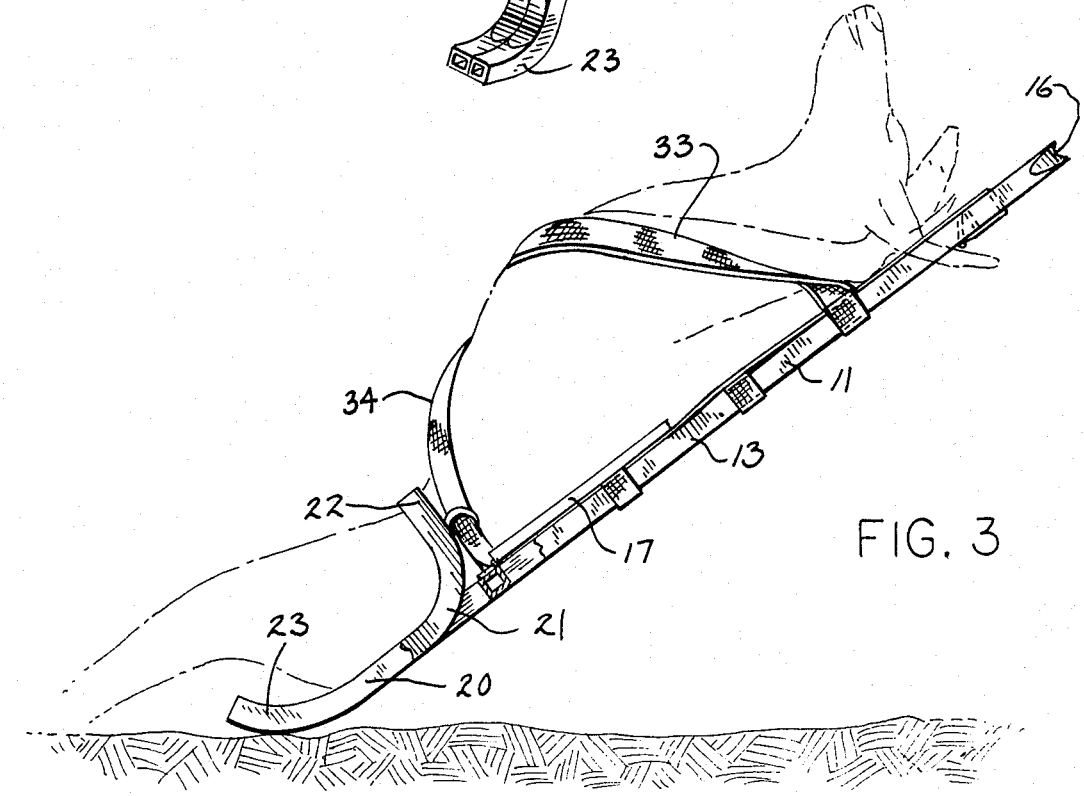

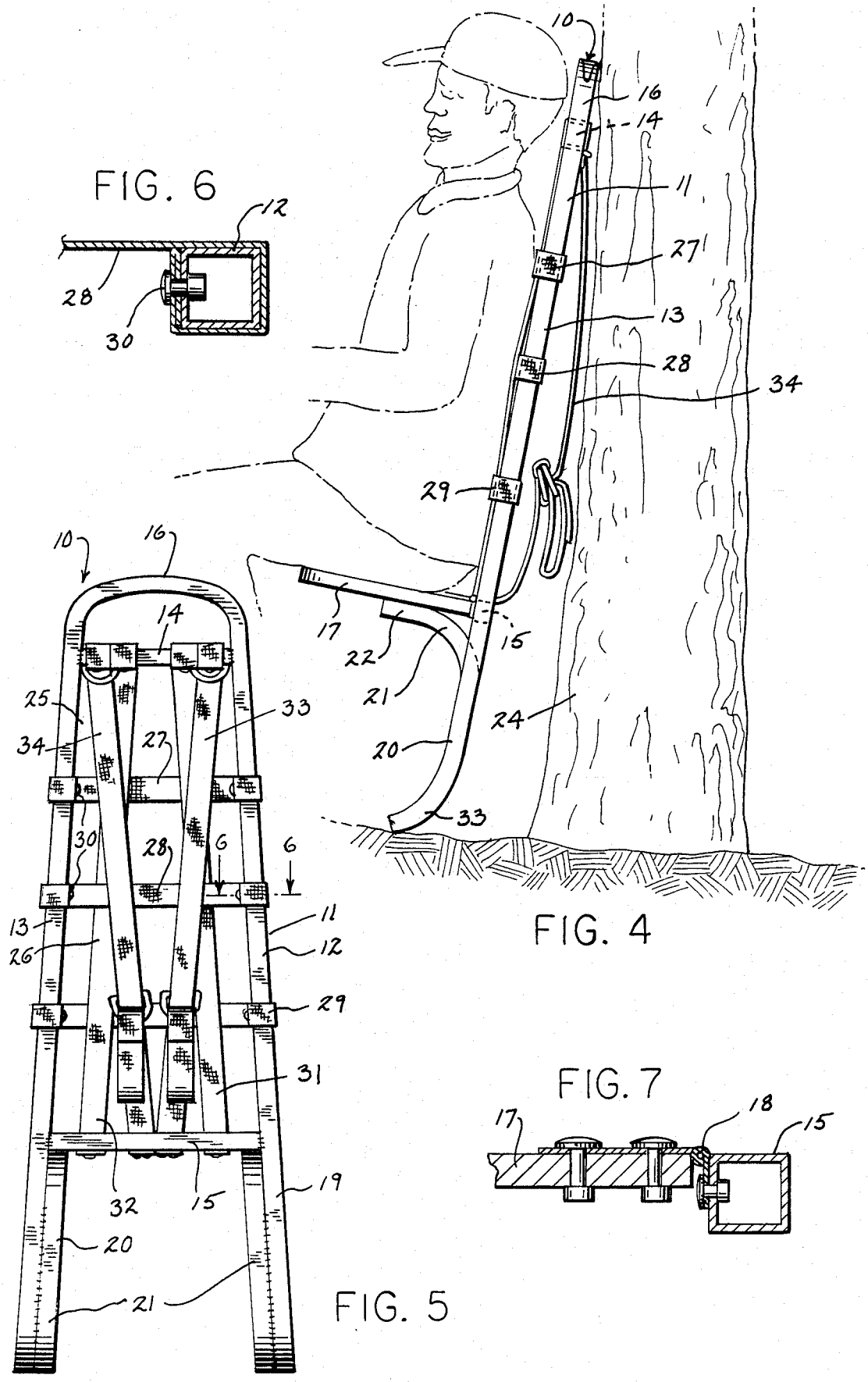

4,836,938

MULTIPURPOSE CHAIR STRUCTURE

BACKGROUND OF THE INVENTION

This invention relates to a multipurpose chair structure intended primarily for use by hunters and other outdoorsmen.

A reasonably comfortable chair on a deer stand, in a duck blind or in a camp can be much appreciated. However, a chair can be a substantial burden when enroute on foot to the stand, the blind or the camp. If a chair, however, is light weight and serves other useful purposes aside from merely sitting, it may yet find substantial appeal. It is generally an object of this invention to provide a multipurpose chair structure which likely will have substantial appeal for hunters and other outdoorsmen.

SUMMARY OF THE INVENTION

Broadly the multipurpose chair of this invention comprises a generally planar upright frame which includes a pair of transversely spaced and vertically extending side members. A seat is mounted on the frame. The frame is provided with backrest means which extend between the side members and above the seat. The side members extend beneath the seat to provide a pair of transversely spaced legs. The pair of transversely spaced legs serve to support the seat for sitting when the frame is propped up against some fixed object.

DESCRIPTION OF THE DRAWING FIGURES

The drawings furnished herewith illustrate the best mode presently contemplated for the invention and are described hereinafter.

In the drawings:

FIG. 1 is a perspective view of the hunter's chair of this invention;

FIG. 2 in reduced size shows how the chair of this invention forms a part of a backpack;

FIG. 3 is a side elevation and shows the chair of this invention serving as a travois for big game;

FIG. 4 is a side elevation and shows the chair serving as a seat;

FIG. 5 is a rear elevation of the chair of this invention;

FIG. 6 is a detail sectional view taken on the line 6—6 of FIG. 5; and

FIG. 7 is a detail sectional view taken on the line 7—7 of FIG. 1.

DESCRIPTION OF THE ILLUSTRATED EMBODIMENT

Referring to the drawings, the chair 10 of this invention generally comprises a portable, high backed, two-legged structure, particularly useful for hunters and other outdoorsmen.

The chair 10 includes a generally planar frame 11 comprising a pair of transversely spaced side rails 12 and 13 connected by a pair of vertically spaced transversely extending cross-members 14 and 15. The upper cross-member 14 is disposed generally adjacent to the upper end of the side rails 12 and 13, and is somewhat shorter in length than the lower cross-member 15 such that the frame 11 tapers to a narrower dimension at its upper end as perhaps best shown in FIG. 5. An arcuate member 16 connects the upper ends of the side rails 12 and 13 upwardly beyond the upper cross-member 14. The side rail members 12 and 13, cross-members 14 and 15 and arcuate member 16 all comprise aluminum box-section members which are welded together to form a relatively strong yet light weight frame structure 11.

The lower cross-member 15 is spaced from the lower end of side rails 12 and 13 a suitable distance for the mounting of a seat 17. The seat 17 is pivotally mounted to the lower cross-member 15 by a pair of transversely spaced hinges 18 as generally shown in FIGS. 1 and 7. The hinged seat 17 is pivotal between a forwardly projecting position generally normal to the frame 11 as shown in FIGS. 1 and 4 and a raised position generally paralleling the frame as shown in Fig. 3.

The lower end of the respective side rail members 12 and 13 comprise the legs 19 and 20 for the chair 10 and are each reinforced by an interiorly disposed adjunct member 21. The lower end portions of the aluminum box-section adjunct members 21 generally parallel to corresponding portions of the side rails 12 and 13 and are welded thereto. The upper portions of each adjunct member 21 is bent to extend forwardly to provide supports 22 for the seat 17. When the seat 17 is lowered to its position generally normal to the frame 11 for sitting, the underside of the seat rests upon the transversely spaced adjunct supports 22 as shown in FIGS. 1 and 4. The extreme lower end portions of the respective legs 19 and 20 are curved forwardly as shown at 23. When propped against a tree 24 or any fixed object, the curved ends at 23 provide for ground support for the legs 19 and 20 well under the seat 17 to enhance the stability of the chair 10.

The frame opening 25 formed between the transversely spaced side rails 12 and 13 and the vertically spaced cross-members 14 and 15 is laced with strapping material to provide a suitable backrest 26 for the chair 10. As perhaps best shown in FIG. 1, three (3) transversely extending cross-straps 27, 28 and 29 are disposed in vertically spaced relation between the cross-members 14 and 15. The respective ends of the straps 27, 28 and 29 extend across the front of the corresponding side rails 12 and 13 and continue around the outside and rear rail surfaces with attachment being made to the inside of the rails with an appropriate fastener 30, as shown in FIG. 6. As shown in FIGS. 1 and 5, the generally vertically extending straps 31 and 32 are spaced from each other and interwoven with the cross-straps 27, 28 and 29. Straps 31 and 32 are spaced from and generally parallel the adjacent side rail. The straps 31 and 32 extend vertically between and to the respective cross-members 14 and 15 for connection. The interwoven strapping material provides a backrest 26 offering considerable comfort to the user of the chair 10.

The two-legged chair 10 being generally comprised of an aluminum frame 11, a backrest 26 of strapping, and a seat 17 weighs less than ten (10) pounds and thus can be toted with relative ease by a hunter or other outdoorsman. However, to make that burden even easier, the chair 10 is outfitted for backpacking. A pair of transversely spaced adjustable carrying straps 33 and 34 are each secured between and to the respective cross-members 14 and 15 and project to the rear side of the chair 10. In service, the straps 33 and 34 extend over the shoulders of the bearer as generally shown in FIG. 2.

As further shown in FIG. 2, the chair 10 may serve as a support frame for the backpacking of other materials and gear. As shown, the seat 17 may be lowered to project generally normal to the frame 11 to provide good support for the load. The relatively wide stance for the legs 19 and 20 as well as the forward projection of the leg ends at 23 generally preclude bumping against the bearer's legs and clothes snagging when enroute. The forwardly curved ends at 23 for the legs 19 and 20 also serve to help avoid hang up by brush when traversing brushland.

As shown in FIG. 3, the chair 10 can also serve as the travois for larger game or other type loads. As a travois, the seat 17 may be pivoted upwardly to generally parallel the frame 11, if desired, and the arcuate member 16 at the upper end of the chair 10 serves as a strong handle for dragging by one (1) or more persons. If desired, the carrying straps 33 and 34 may be employed to secure the load onto the travois. The curved ends at 23 for the chair legs 19 and 20 provides the travois with ski-like bearing members to somewhat reduce the friction on the drag.

For hunters and other outdoorsmen, the chair 10 can be a source of relative comfort on reaching the stand, the blind or the camp. If need be, the chair 10 can also be useful enroute thereto.

Various modes of carrying out the invention are contemplated as being within the scope of the following claims particularly pointing out and distinctly claiming the subject matter which is regarded as the invention.

I claim:

1. In a multipurpose structure, a generally upright frame assembly having a pair of transversely spaced side rails connected by upper and lower transversely extending cross-members, said upper cross-member being disposed adjacent to the upper end of the side rails and said lower cross-member being spaced upwardly from the lower end of the side rails, a plate member hingedly connected to the frame assembly adjacent to the lower cross-member and being pivotally movable between a position generally normal to the frame assembly and a position generally paralleling the assembly, strapping means extending between the side rails and cross-members, respectively, said side rails extending beneath the lower cross-member to provide a pair of transversely spaced legs, said pair of legs supporting the structure as a chair when the frame assemble is propped up against a fixed object with the plate member disposed normal to the assembly to form a seat and with the strapping means serving as a backrest, said pair of legs alternatively supporting the structure for movement over the ground as a travois with the frame assembly and strapping means serving as a platform for carrying a load, said pair of legs further having forwardly curved lower end portions that extend well under the plate member seat to thereby enhance the stability of the structure as a chair, said curved leg end portions serving as ski-like bearing members for movement over the ground when the structure is used as a travois.

2. The structure as set forth in claim 1 wherein all of the frame assembly elements comprise box-section elements providing for an assembly of substantial strength.

3. The structure as set forth in claim 2 wherein all of the frame assembly elements are made of aluminum to enhance the portability of the structure.

4. The structure as set forth in claim 1 wherein the length of the lower cross-member exceeds the length of the upper cross-member to provide a frame assembly that tapers upwardly to a narrower dimension and offers a relatively wider leg stance.

5. The structure as set forth in claim 1 wherein carrying straps are connected to the cross-members and are disposed on the side of the frame assembly opposite from the plate member, said multipurpose structure alternatively serving as a backpack carrier with the load supported on the plate member and secured relative to the frame assembly.

6. The structure as set forth in claim 1 wherein the legs are reinforced by adjunct members that project forwardly at their upper end to provide transversely spaced support means for the plate member seat when the latter is disposed in the position generally normal to the frame assembly for sitting.

7. The structure as set forth in claim 1 wherein an arcuate member connects the upper ends of the frame assembly side rails and serves as a handle for moving the structure over the ground as a travois.

* * * * *